(12) United States Patent
Kim et al.

(10) Patent No.: US 8,676,220 B2
(45) Date of Patent: Mar. 18, 2014

(54) APPARATUS AND METHOD FOR OPERATING HIERARCHICAL CELL IN BROADBAND WIRELESS COMMUNICATION SYSTEM

(75) Inventors: Yung-Soo Kim, Seongnam-si (KR); Jong-Hyung Kwun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 787 days.

(21) Appl. No.: 12/416,864

(22) Filed: Apr. 1, 2009

(65) Prior Publication Data

US 2009/0252073 A1    Oct. 8, 2009

(30) Foreign Application Priority Data

Apr. 3, 2008  (KR) .................. 10-2008-0031152

(51) Int. Cl.
 H04W 4/00 (2009.01)
 H04W 40/00 (2009.01)
 G08C 17/00 (2006.01)
 H04B 7/00 (2006.01)
 H04W 36/00 (2009.01)

(52) U.S. Cl.
 USPC ........... 455/449; 455/522; 455/436; 370/311; 370/332

(58) Field of Classification Search
 USPC .................. 455/449, 522, 436; 370/311, 332
 See application file for complete search history.

(56) References Cited

U.S. PATENT DOCUMENTS

2006/0160558 A1    7/2006  Kim et al.
2007/0042799 A1*   2/2007  Jubin et al. .................... 455/522
2007/0066329 A1    3/2007  Laroia et al.
2007/0097939 A1    5/2007  Nylander et al.
2007/0183427 A1    8/2007  Nylander et al.
2007/0211757 A1*   9/2007  Oyman ......................... 370/468
2009/0040954 A1*   2/2009  Usuba ........................... 370/311
2009/0061873 A1*   3/2009  Bao et al. ...................... 455/436
2009/0092111 A1*   4/2009  Horn et al. ..................... 370/338
2009/0093251 A1*   4/2009  Cai et al. ....................... 455/436
2009/0163238 A1*   6/2009  Rao et al. ....................... 455/522
2009/0168727 A1*   7/2009  Somasundaram et al. .... 370/332

FOREIGN PATENT DOCUMENTS

JP      2002158609 A  *  5/2002
WO      2006/088135 A1   8/2006
WO   WO 2006088135 A1 *  8/2006

OTHER PUBLICATIONS

Siemens AG, A Method for Interference Control and Power Saving for Home Access Point, IP.COM Journal, IP COM Inc., West Henrietta, NY, US, Dec. 13, 2007.

Huawei, hNB Interference Reduction, 3GPP Draft; R2-080188, 3rd Generation Partnership Project, Mobile Competence Centre, vol. RAN WG2, Sevilla, Spain, Jan. 8, 2008.

(Continued)

*Primary Examiner* — Opiribo Georgewill
(74) *Attorney, Agent, or Firm* — Jefferson IP Law, LLP

(57) ABSTRACT

An apparatus and method for operating a hierarchical cell in a wireless communication system are provided. A femto BS transitions into a sleep mode if there is no accessed MS for a predefined time. The femto BS transmits a FEMTO-ADV message in the sleep mode to notify of the presence of the femto BS. The femto BS releases the sleep mode upon receiving a MOB-FEMTO-AWAKE-REQ message from an MS receiving the FEMTO-ADV message. Thereafter, the femto BS communicates with the MS.

22 Claims, 9 Drawing Sheets

(56) References Cited

OTHER PUBLICATIONS

Mitsubishi Electric, Dynamic Setup of HNBs, 3GPP Draft; R3-080064, Dynamic Setup HNBs, 3rd Generation Partnership Project, Mobile Competence Centre, vol. RAN WG3, Sorrento, Italy, Feb. 5, 2008.

Mitsubishi Electric, Dynamic Setup of HNBs for Energy Savings and Interference Reduction, 3rd Generation Partnership Project, Technicalspecification Group, RAN WG3, vol. R3-080658, Mar. 31, 2008.

Mitsubishi Electric, Dynamic Setup of HNBs for Energy Savings and Interference Reduction, 3GPP Draft; R3-081949, 3rd Generation Partnership Project; Mobile Competence Centre, vol. RAN WG3, Jeju Island, Aug. 13, 2008.

Tiedemann, Femtocell Activities in 3GPP2 TSG-C, C00-200293003-059R1, pp. 1-17, Mar. 31, 2009, Retrieved from the Internet: URL: ftp://ftp.3gpp2.org/TSGC/Working/2009/2009-03-NewOrleans/TSG-C-2009-03-New%20rleans/Pleary/ (retrived on Oct. 21, 2010).

* cited by examiner

APPARATUS AND METHOD FOR OPERATING HIERARCHICAL CELL IN BROADBAND WIRELESS COMMUNICATION SYSTEM

PRIORITY

The present application claims the benefit under 35 U.S.C. §119(a) of a Korean patent application filed in the Korean Intellectual Property Office on Apr. 3, 2008 and assigned Serial No. 10-2008-0031152, the entire disclosure of which is hereby incorporated by reference.

BACKGROUND OF THE INVENTION

1. Field of the Invention

The present invention relates to a broadband wireless communication system. More particularly, the present invention relates to an apparatus and method for operating a hierarchical cell in a broadband wireless communication system.

2. Description of the Related Art

A cellular wireless communication system includes a plurality of cells serviced respectively by a plurality of Base Stations (BSs), and each BS communicates wirelessly with Mobile Stations (MSs) within the range of its cell. Thus, an MS receives a service through wireless communication with the BS servicing the cell where the MS is located. However, if the channel condition between the MS and the BS becomes poor due to a geographical condition in the cell, a distance between the MS and the BS, or a movement of the MS, the communication between the MS and the BS may not be able to be performed or the communication performance may be degraded. In particular, if the MS is located in a closed building such as an office or a house, the channel condition between the MS and the BS may become very poor, which causes a propagation shadow area. Thus, the MS located in the propagation shadow area may fail to receive a desired level of service.

An indoor femto BS has been proposed to address the problem of the indoor propagation shadow area. That is, if the conventional BS cannot provide a seamless communication service, a femto BS may be installed to service an indoor propagation shadow area and allow indoor MSs to receive a service through the femto BS, thereby improving an indoor call quality. The femto BS is a small-sized BS that is connected to a mobile communication core network through an indoor broadband network (e.g., x Digital Subscriber Line (xDSL) or cable network) to improve an indoor call quality. Thus, if there is an indoor accessible femto BS, an MS communicates with the femto BS.

As described above, a femto BS may be used to improve the call quality of a user in an indoor shadow area. In addition, a mobile service provider may control the call rates of subscribers variably in such a way as to discount the call rate of a subscriber accessing the femto BS. Unlike an outdoor macro BS having a large coverage with a radius of several kilometers, the femto BS has a small coverage with a radius of several meters and thus has a high probability of being accessed by only a few users. Due to the characteristics of the femto BS, the power for operation of the femto BS must be supplied directly indoors. In this case, if the power consumption of the femto BS is high, it becomes a serious obstacle to the use of the femto BS. What is therefore required is a technique to minimize the power consumption of the femto BS if no user is accessing the femto BS. In addition, if a plurality of femto BSs are installed densely in a common area, each of the femto BSs may interfere with adjacent MSs accessing the macro BS, or femto-BS MSs accessing the other femto BS. What is therefore required is a technique to minimize the interference caused by the use of the femto BSs.

SUMMARY OF THE INVENTION

An aspect of the present invention is to address at least the above-mentioned problems and/or disadvantages and to provide at least the advantages described below. Accordingly, an aspect of the present invention is to provide an apparatus and method for increasing an efficiency of a femto BS in a broadband wireless communication system.

Another aspect of the present invention is to provide an apparatus and method for reducing a power consumption of a femto BS in a broadband wireless communication system.

Another aspect of the present invention is to provide an apparatus and method for reducing interference between femto BSs in a broadband wireless communication system.

Another aspect of the present invention is to provide an apparatus and method for supporting a sleep mode of a femto BS in a broadband wireless communication system.

Another aspect of the present invention is to provide an apparatus and method for notifying an MS of an entry into a cell of a sleep-mode femto BS in a broadband wireless communication system.

In accordance with an aspect of the present invention, a method for an operation of a femto BS in a broadband wireless communication system is provided. The method includes transitioning into a sleep mode if there is no accessed MS for a predefined time, and transmitting a FEMTO ADVertisement (FEMTO-ADV) message in the sleep mode to notify of the presence of the femto BS, releasing the sleep mode upon receiving a MOBile FEMTO AWAKE REQuest (MOB-FEMTO-AWAKE-REQ) message from an MS that has received the FEMTO-ADV message.

In accordance with another aspect of the present invention, a method for an operation an MS in a broadband wireless communication system is provided. The method includes receiving a FEMTO-ADV message from a femto BS servicing a shadow area in a macro cell, transmitting a MOB-FEMTO-AWAKE-REQ message to the femto BS upon receiving the FEMTO-ADV message, and accessing the femto BS.

In accordance with yet another aspect of the present invention, a method for an operation of a macro BS in a broadband wireless communication system is provided. The method includes allocating a portion of radio resources of the macro BS as a radio resource for transmitting a FEMTO-ADV message of a femto BS when notified of a sleep mode transition by the femto BS servicing a shadow area in a macro cell, prohibiting the use of the radio resource for transmitting the FEMTO-ADV message, and broadcasting the allocation information of the radio resource for transmitting the FEMTO-ADV message.

In accordance with a further aspect of the present invention, an apparatus for a femto BS in a broadband wireless communication system is provided. The apparatus includes a transmitter for transmitting a FEMTO-ADV message in a sleep mode to notify of the presence of the femto BS, and a mode determiner for transitioning into the sleep mode if there is no accessed MS for a predefined time, and for releasing the sleep mode upon receiving a MOB-FEMTO-AWAKE-REQ message from an MS receiving the FEMTO-ADV message.

In accordance with still another aspect of the present invention, an apparatus for an MS in a broadband wireless communication system is provided. The apparatus includes a receiver for receiving a FEMTO-ADV message from a femto BS servicing a shadow area in a macro cell, a transmitter for transmitting a MOB-FEMTO-AWAKE-REQ message to the femto BS upon receiving the FEMTO-ADV message, and a communication controller for accessing the femto BS.

In accordance with yet another aspect of the present invention, an apparatus for a macro BS in a broadband wireless communication system is provided. The apparatus includes a resource allocator for allocating a portion of radio resources of the macro BS as a radio resource for transmitting a FEMTO-ADV message of a femto BS when being notified of a sleep mode transition by the femto BS servicing a shadow area in a macro cell, a communication controller for prohibiting use of the radio resource for transmitting the FEMTO-ADV message, and a transmitter for broadcasting allocation information of the radio resource for transmitting the FEMTO-ADV message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention are intended to provide a scheme for operating a hierarchical cell structure in a broadband wireless communication system. The following description is made in the context of an Orthogonal Frequency Division Multiplexing (OFDM)/Orthogonal Frequency Division Multiple Access (OFDMA) wireless communication system, to which the present invention is not limited. Thus, it should be clearly understood that the present invention is also applicable to any other wireless communication system.

Figure 1:
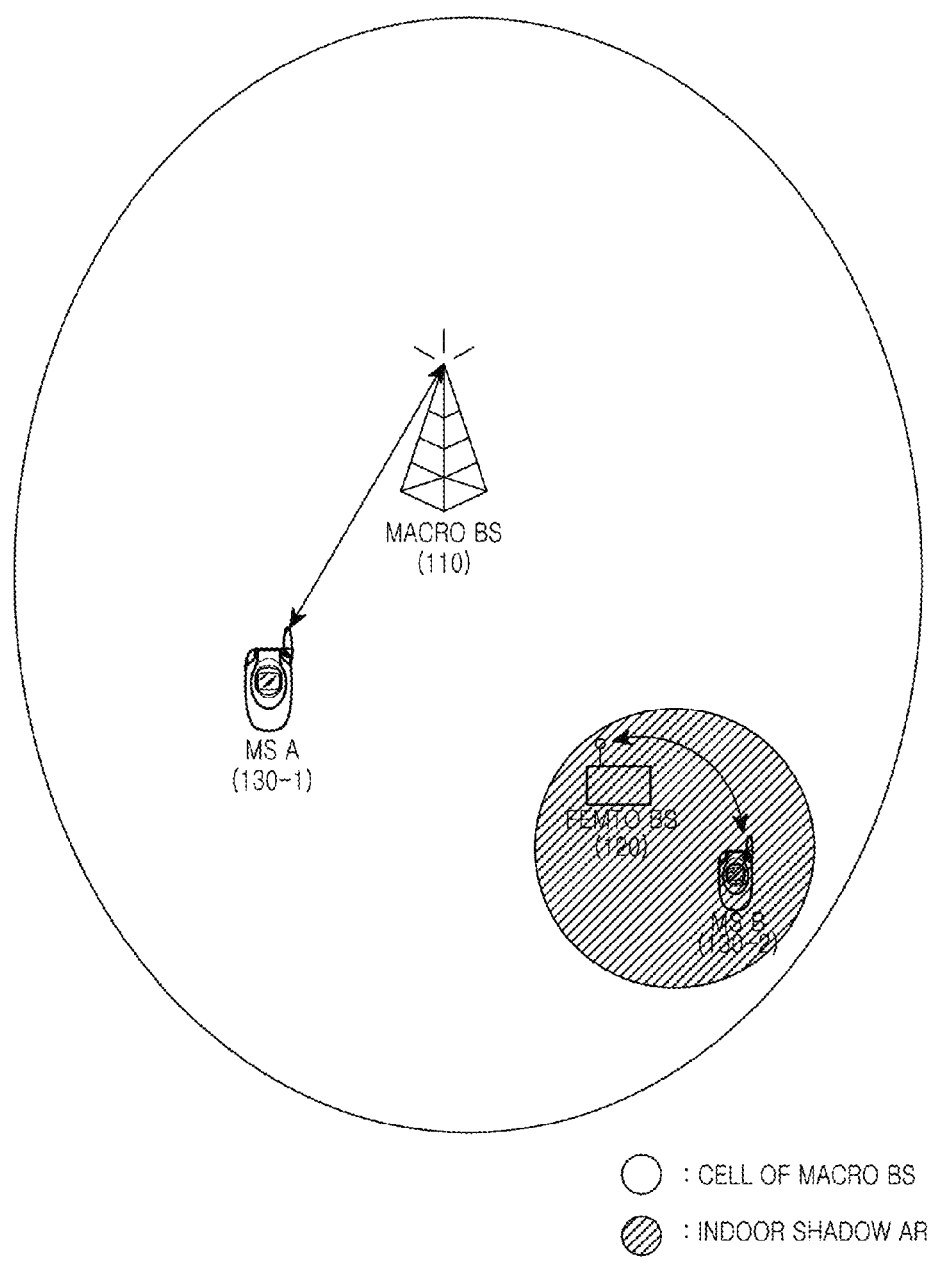
FIG. 1 illustrates a hierarchical cell structure of a broadband wireless communication system according to an exemplary embodiment of the present invention.

FIG. 1 illustrates a hierarchical cell structure of a broadband wireless communication system according to an exemplary embodiment of the present invention.

Referring to FIG. 1, a macro Base Station (BS) 110 has its own cell and communicates wirelessly with a Mobile Station (MS) A 130-1 located in the cell. That is, the MS A 130-1 receives a service through the macro BS 110. However, the macro BS 110 cannot communicate with an MS 130-2 located in an indoor shadow area. Thus, the MS B 130-2 cannot receive a service through the macro BS 110. A femto BS 120 accessible by the MS B 130-2 is located in the indoor shadow area, and the MS B 130-2 receives a service through the femto BS 120.

The femto BS 120 is an indoor small-sized BS that is installed by a user or a network service provider and is connected to a core network of a mobile service provider through an indoor broadband network (e.g., xDSL or cable network) provided by an Internet service provider. The femto BS 120 communicates with the MS located in its own cell (i.e., the indoor shadow area), but the MS is not always present in the indoor shadow area. Thus, if the MS is not present in the indoor shadow area, the femto BS 120 transitions to a femto BS sleep mode in order to reduce the power consumption and minimize the influence of an interference with adjacent MSs that have accessed another BS. Herein, the femto BS sleep mode refers to a state in which the femto BS 120 transmits signals which are transmitted in order to operate as a normal BS, not in every frame, but in a specific frame or does not transmit some of the signals. Then, upon detecting the entry of the MS into the indoor shadow area, the femto BS 120 releases the sleep mode and operates in a normal femto BS mode (i.e., an active mode).

The femto BS 120 may be one of an open access femto BS, a Closed Subscriber Group (CSG) access femto BS and a hybrid access BS, depending on the restrictions of accessible MSs. The open access femto BS is accessible by all the users subscribed to the mobile service provider. The CSG access femto BS is accessible by certain users accepted by the mobile service provider and the femto BS installer. The hybrid access femto BS supports both the open access and the CSG access. The hybrid access femto BS operates as a CSG access femto BS for certain CSG users and operates as an open access femto BS for general users that are not CSG users covered by the femto BS. Herein, the CSG users of the hybrid access femto BS may have preferred access to femto BS. In addition, in order to provide a seamless service for the CSG users, the hybrid access femto BS may limit the radio resource for the general users below a predefined level.

As illustrated in FIG. 1, the cell of the femto BS 120 is included in the cell of the macro BS 110, which is hereinafter referred to as a hierarchical cell structure.

A sleep mode transition process and a sleep mode release process of the femto BS will be briefly described below.

First, if no MS accesses the femto BS for a predefined amount of time, the femto BS transitions to a sleep mode. Thereafter, the femto BS periodically transmits a FEMTO ADVertisement (FEMTO-ADV) message through one frame to notify its presence to MSs, and waits to receive an MS response message for the FEMTO-ADV message. That is, the sleep-mode femto BS repeatedly transmits the FEMTO-ADV message and monitors whether a response message is received from the MS. For example, the sleep-mode femto BS periodically transmits the FEMTO-ADV message transmission and monitors for the MS response message reception, while refraining from system information transmission, frame synchronization information transmission, preamble transmission, resource allocation information transmission, and data transmission/reception.

Herein, the FEMTO-ADV message is transmitted through a radio resource and a frame that are negotiated between the macro BS, the femto BS and the MS. That is, the femto BS directly transmits the FEMTO-ADV message through a predefined radio resource of a predefined frame in a frequency band used by the macro BS, i.e., a predefined subcarrier in a predefined symbol of a predefined antenna. Thus, when entering the coverage area of the femto BS during communication with the macro BS, the MS receives the FEMTO-ADV message without a separate operation such as a shift to the frequency band used by the femto BS. In addition, the macro BS does not use the predefined radio resource of the predefined frame for transmitting the FEMTO-ADV message, and notifies the MSs that the predefined radio resource is used to transmit the FEMTO-ADV message. Accordingly, the MS receives the FEMTO-ADV message through the predefined radio resource without interfering with the macro BS.

Figure 2:
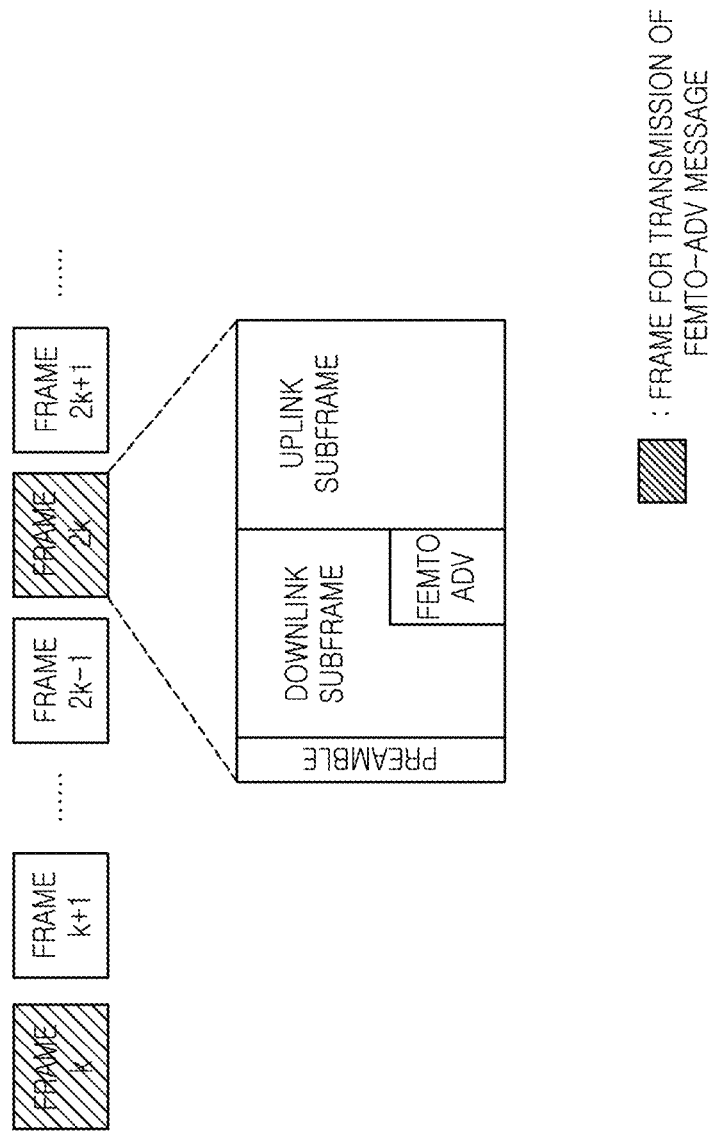
FIG. 2 illustrates an example of transmission of a FEMTO ADVertisement (FEMTO-ADV) message in a broadband wireless communication system according to an exemplary embodiment of the present invention.

A specific policy of operating the radio resource for the FEMTO-ADV message in the system may vary depending on the exemplary embodiments of the present invention. For example, all macro BSs may allocate a fixed radio resource equally, or each of the macro BSs may allocate a different radio resource dynamically depending on whether a sleep-mode femto BS is present. For example, if the FEMTO-ADV message is to be transmitted at intervals of k frames, the femto BS transmits the FEMTO-ADV message through the predefined radio resource of the macro BS at (n×k)th frames, as illustrated in FIG. 2. FIG. 2 illustrates an example of transmission of a FEMTO-ADV message in a broadband wireless communication system according to an exemplary embodiment of the present invention. In addition, prior to transmission, the FEMTO-ADV message is converted into the same format as the format of a signal used by the macro BS. To this end, the femto BS must beforehand obtain physical signal information such as a signal transmit (TX) timing, a frame format, and a frequency band of the macro BS through a wired back-haul interface or other means.

It is preferable that the FEMTO-ADV message is not received by an MS located outside the cell of the femto BS. Herein, the receive (RX) range of the FEMTO-ADV message is determined according to the TX power of the FEMTO-ADV message. The TX power restricting the RX range is determined according to the TX power of a common control channel or a broadcast channel. In order to access the femto BS, the MS must be located in an area capable of receiving the common control channel and the broadcast channel transmitted by the femto BS. Thus, if the TX power of the FEMTO-ADV message is equal to the TX power of the common control channel or the broadcast channel, the FEMTO-ADV message is not received by the MS located outside the cell of the femto BS. Herein, if the MS is to receive the FEMTO-ADV message after entry into the cell of the femto BS, the TX power of the FEMTO-ADV message may be controlled to be lower than the TX power of the common control channel or the broadcast channel in consideration of an additional gain value. On the other hand, if the femto BS is to release the sleep mode before the MS reaches a cell boundary point of the femto BS, the TX power of the FEMTO-ADV message may be controlled to be higher than the TX power of the common control channel or the broadcast channel.

The FEMTO-ADV message includes information about a BS identifier that enables the MS to identify the femto BS. The FEMTO-ADV message may further include at least one of information about a frequency band of the femto BS, information about an access mode of the femto BS, information about a CSG BS operation state indication bit of the femto BS, information about a CSG identifier accessible to the femto BS, information about a BS identifier allocated to the femto BS uniquely in the network, and information necessary for the MS to transmit a response message to the femto BS. For example, the information necessary for transmission of the response message may include information about a TX timing and an uplink ranging code resource used as the response message.

Figure 3A:
FIGS. 3A and 3B illustrate examples of a FEMTO-ADV message signal in a broadband wireless communication system according to exemplary embodiments of the present invention.
Figure 3B:
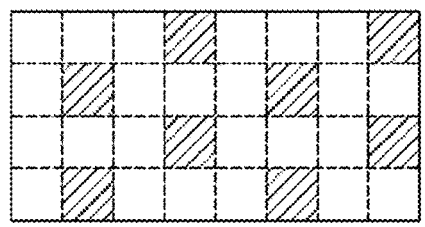

The channel between the femto BS and the MS is different from the channel between the macro BS and the MS. Therefore, a signal of the FEMTO-ADV message must be designed so that the channel estimation may also be performed by using the signal. That is, the FEMTO-ADV message signal includes a signal for channel estimation. For example, the FEMTO-ADV message signal includes a preamble as illustrated in FIG. 3A, or includes pilot symbols as illustrated in FIG. 3B. FIGS. 3A and 3B illustrate examples of a FEMTO-ADV message signal in a broadband wireless communication system according to exemplary embodiments of the present invention.

Due to the aforesaid operation of the femto BS, the MS located in the coverage area of the femto BS receives the FEMTO-ADV message. Then, the MS receiving the FEMTO-ADV message notifies the femto BS of its entry into the cell of the femto BS. Accordingly, the femto BS releases a sleep mode, in other words, returns to an active mode, and prepares a communication with the MS. Herein, if the femto BS operates in a CSG access mode, the MS receiving the FEMTO-ADV message from the femto BS determines whether the femto BS is accessible by the MS, and transmits a response message when the femto BS is an accessible femto BS.

The response message may be transmitted according to a random access scheme or a dedicated access scheme. The random access scheme transmits signals competitively in a predefined period without allocation of a radio resource. The dedicated access scheme transmits signals in a predefined format through a predefined radio resource. According to the dedicated access scheme, the MS uses information about a TX timing and an uplink ranging code resource for transmission of the response message, which are included in the FEMTO-ADV message.

Hereinafter, the operations and configurations of the femto BS, the MS and the macro BS will be described in detail with reference to the accompanying drawings.

Figure 4:
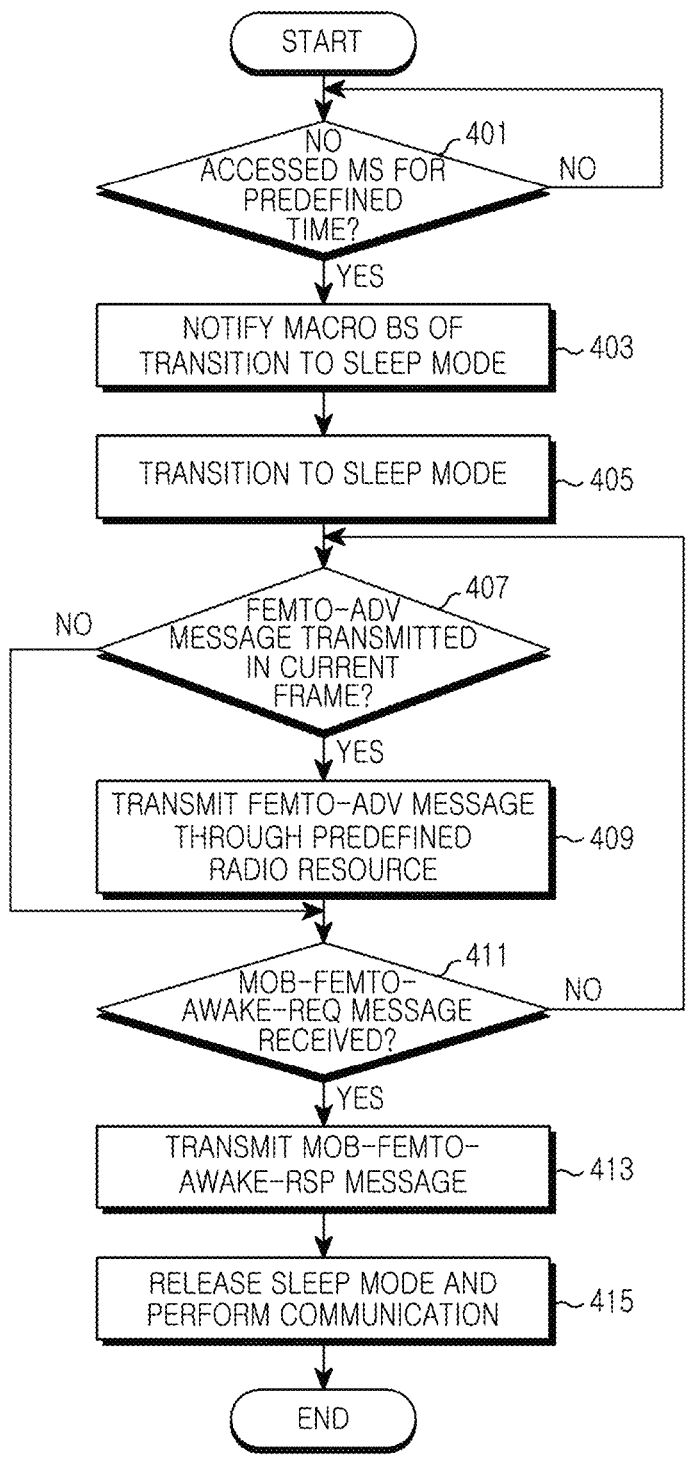
FIG. 4 illustrates an operation process of a femto BS in a broadband wireless communication system according to an exemplary embodiment of the present invention.

FIG. 4 is a flowchart illustrating an operation process of a femto BS in a broadband wireless communication system according to an exemplary embodiment of the present invention.

Referring to FIG. 4, in step 401, the femto BS determines whether there is no accessed MS for a predefined amount of time. Herein, the predefined amount of time is an amount of time that is preset for sleep mode transition. That is, the femto BS determines whether the condition for transition to a sleep mode is satisfied.

If there is no accessed MS for the predefined amount of time, the femto BS proceeds to step 403. In step 403, the femto BS notifies the macro BS of a transition to a sleep mode. To this end, the femto BS and the macro BS perform wireless communication or perform wired communication through a backhaul. Accordingly, the macro BS detects the sleep mode transition of the femto BS, and does not use the radio resources that are allocated periodically for transmission of the FEMTO-ADV message of the femto BS until the femto BS releases the sleep mode.

In step 405, the femto BS transitions to the sleep mode. That is, the femto BS does not perform system information transmission, preamble transmission, resource allocation information transmission, and data transmission, which are performed in the active mode, so that the power consumption of the femto BS decreases.

In step 407, the femto BS determines whether the FEMTO-ADV message is transmitted in the current frame. That is, the FEMTO-ADV message is periodically transmitted and the period is calculated in units of frames. Herein, in the case of an asynchronous system where the femto BS and the macro BS are not synchronous with each other, the step of determining whether the current frame is a frame to transmit the FEMTO-ADV message is replaced by the step of calculating the TX timing of the FEMTO-ADV message in consideration of the synchronization offset with the macro BS. If the FEMTO-ADV message is not transmitted in the current frame, the femto BS proceeds to step 411, which is described below.

However, if the FEMTO-ADV message is transmitted in the current frame, the femto BS proceeds to step 409. In step 409, the femto BS transmits the FEMTO-ADV message through a predefined radio resource corresponding to the frame or through a radio resource allocated from the macro BS. Herein, the FEMTO-ADV message is used to notify the presence of the femto BS to MSs entering the cell of the femto BS. In addition, the radio resource for transmission of the FEMTO-ADV message is a portion of the radio resource of the macro BS. At this point, the femto BS generates a signal including the FEMTO-ADV message in substantially the same way as for a signal of the macro BS. Herein, the FEMTO-ADV message signal has a format as illustrated in FIG. 3A or 3B so that the MS can estimate the channel between the femto BS and the MS by using the FEMTO-ADV message signal. In addition, the femto BS controls the TX power of the FEMTO-ADV message so that the FEMTO-ADV message is not received by MSs located outside the cell of the femto BS. More specifically, the femto BS controls the TX power of the FEMTO-ADV message to be substantially equal to the TX power of a broadcast channel or a common control channel. Herein, if the MS is to receive the FEMTO-ADV message after entry into the cell of the femto BS, the TX power of the FEMTO-ADV message is controlled to be lower than the TX power of the common control channel or the broadcast channel in consideration of an additional gain value. On the other hand, if the femto BS is to release the sleep mode before the MS reaches a cell boundary point of the femto BS, the TX power of the FEMTO-ADV message is controlled to be higher than the TX power of the common control channel or the broadcast channel. Thereafter, the femto BS proceeds to step 411.

In step 411, the femto BS determines whether a MOBile FEMTO AWAKE REQuest (MOB-FEMTO-AWAKE-REQ) message is received. Herein, the MOB-FEMTO-AWAKE-REQ message refers to a message that is transmitted in response to the FEMTO-ADV message by the MS receiving the FEMTO-ADV message. If the MOB-FEMTO-AWAKE-REQ message is not received, the femto BS returns to step 407.

However, if the MOB-FEMTO-AWAKE-REQ message is received, the femto BS proceeds to step 413. In step 413, the femto BS transmits a MOBile FEMTO AWAKE ReSPonse (MOB-FEMTO-AWAKE-RSP) message in response to the MOB-FEMTO-AWAKE-REQ message. That is, the femto BS notifies the MS, which transmitted the MOB-FEMTO-AWAKE-REQ message, that it has detected the entry of the MS.

In step 415, the femto BS releases the sleep mode and transitions to the active mode. In addition, the femto BS notifies the macro BS of the transition to the active mode through a wired or wireless process. Thereafter, the femto BS performs a communication with the MS that transmitted the MOB-FEMTO-AWAKE-REQ message.

Figure 5:
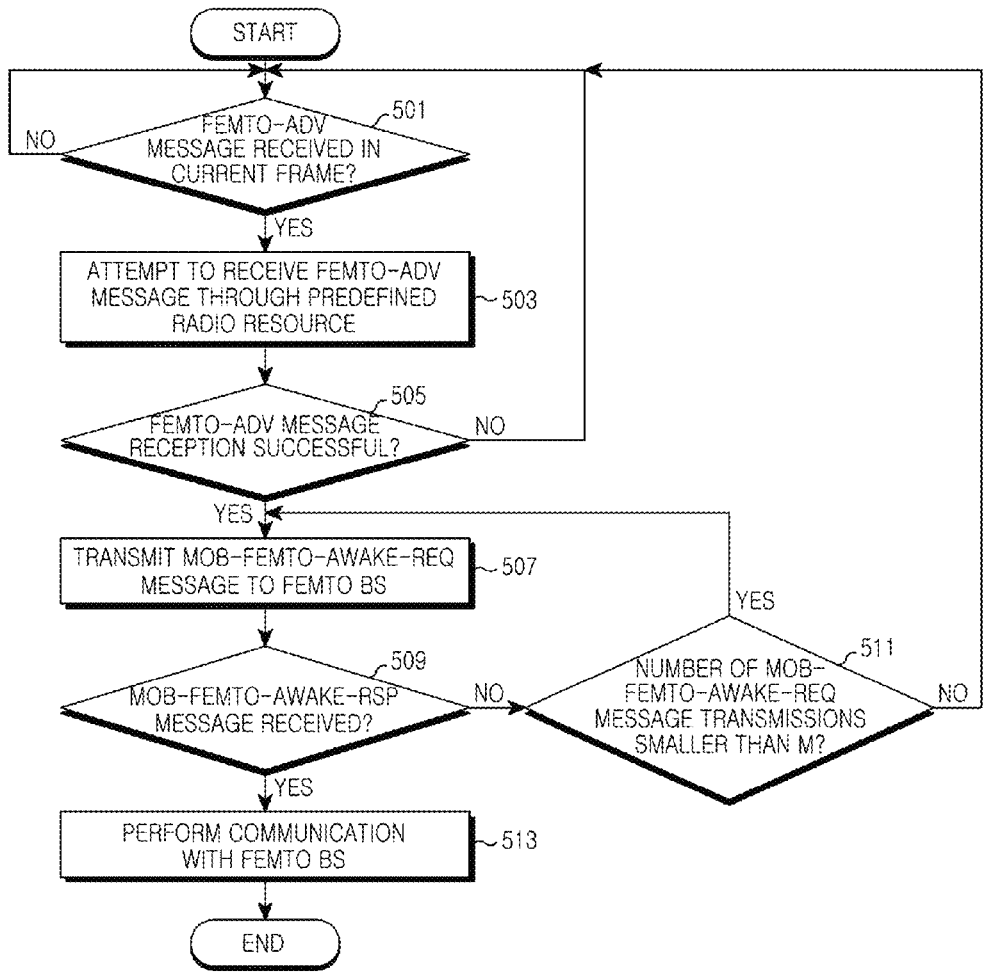
FIG. 5 illustrates an operation process of an MS in a broadband wireless communication system according to an exemplary embodiment of the present invention.

FIG. 5 is a flowchart illustrating an operation process of the MS in a broadband wireless communication system according to an exemplary embodiment of the present invention.

Referring to FIG. 5, in step 501, the MS determines whether the FEMTO-ADV message is received in the current frame. That is, the FEMTO-ADV message is periodically transmitted by the femto BS and the period is calculated in units of frames. Herein, the TX period of the FEMTO-ADV message and the allocation information of the radio resource for transmission of the FEMTO-ADV message are predefined or detected through a message broadcasted by the macro BS. transmitted If the FEMTO-ADV message is received in the current frame, the MS proceeds to step 503. In step 503, the MS attempts to receive the FEMTO-ADV message through the radio resource corresponding to the frame allocated for transmission of the FEMTO-ADV message. That is, the MS converts a signal received through the radio resource allocated for transmission of the FEMTO-ADV message into a bit string. Herein, a signal of the FEMTO-ADV message is generated in substantially the same way as for a signal of the macro BS. In addition, the FEMTO-ADV message signal has a format as illustrated in FIG. 3A or 3B so that the channel between the femto BS and the MS can be estimated by using the FEMTO-ADV message signal. Thus, according to the channel value estimated using the signal received through the radio resource allocated for transmission of the FEMTO-ADV message, the MS performs distortion compensation and bit string conversion.

In step 505, the MS determines whether the FEMTO-ADV message is received. That is, the MS determines whether the signal received through the radio resource allocated for transmission of the FEMTO-ADV message is the FEMTO-ADV message. For example, the MS performs an error check on the bit string converted from the signal received through the radio resource allocated for transmission of the FEMTO-ADV message, and determines whether the bit string includes values corresponding to the FEMTO-ADV message, thereby determining whether the received signal includes the FEMTO-ADV message. Herein, the FEMTO-ADV message may include information about a TX timing and an uplink ranging code resource used for transmission of the MOB-FEMTO-AWAKE-REQ message. If the FEMTO-ADV message is not successfully received, the MS returns to step 501.

However, if the FEMTO-ADV message is received, the MS proceeds to step 507. In step 507, the MS transmits the MOB-FEMTO-AWAKE-REQ message to the femto BS. That is, because the reception of the FEMTO-ADV message means the MS has entered into the cell of the sleep-mode femto BS, the MS requests the sleep mode release of the femto BS in order to perform a communication with the femto BS. Herein, the MS transmits the MOB-FEMTO-AWAKE-REQ message according to an uplink random access scheme or a dedicated access scheme. For example, the MS transitions to an uplink frequency band used by the femto BS and then transmits the MOB-FEMTO-AWAKE-REQ message according to the uplink random access scheme. On the other hand, if the FEMTO-ADV message received in step 505 includes information about a TX timing and an uplink ranging code resource used for transmission of the MOB-FEMTO-AWAKE-REQ message, the MS transmits the MOB-FEMTO-AWAKE-REQ message according to the dedicated access scheme by using the above information. Herein, if the MS needs to transmit the MOB-FEMTO-AWAKE-REQ message during the communication with the macro BS, the MS requests the macro BS to allocate a gap period for transmission of the MOB-FEMTO-AWAKE-REQ message, and transmits the MOB-FEMTO-AWAKE-REQ message to the macro BS. In addition, if the FEMTO-ADV message includes information indicating the CSG access-mode operation of the femto BS, the MS determines whether it is accessible to the femto BS, and then transmits the MOB-FEMTO-AWAKE-REQ message when there is an accessible femto BS. For example, the accessibility is determined by comparing an accessible CSG identifier list stored in the MS and a CSG identifier included in the FEMTO-ADV message.

In step 509, the MS determines whether the MOB-FEMTO-AWAKE-RSP message is received. That is, the MS determines whether the femto BS received the MOB-FEMTO-AWAKE-REQ message and released the sleep mode.

If the MOB-FEMTO-AWAKE-RSP message is not received, the MS proceeds to step 511. In step 511, the MS determines whether the number of times the MOB-FEMTO-AWAKE-REQ message is retransmitted is smaller than 'M'. Herein, if the MOB-FEMTO-AWAKE-RSP message is not received within a predefined time after transmission of the MOB-FEMTO-AWAKE-REQ message, the MS determines that the MOB-FEMTO-AWAKE-RSP message is not received. The M is a parameter that is preset to limit the maximum number of times the MOB-FEMTO-AWAKE-REQ message is retransmitted. That is, the retransmission of the MOB-FEMTO-AWAKE-REQ message can be repeated by up to (M−1) times. If the number of times the MOB-FEMTO-AWAKE-REQ message is retransmitted is smaller than 'M', the MS returns to step 507, and if it is greater than 'M', the MS returns to step 501.

On the other hand, if the MOB-FEMTO-AWAKE-RSP message is received (in step 509), the MS proceeds to step 513. In step 513, the MS performs a communication with the femto BS.

Figure 6:
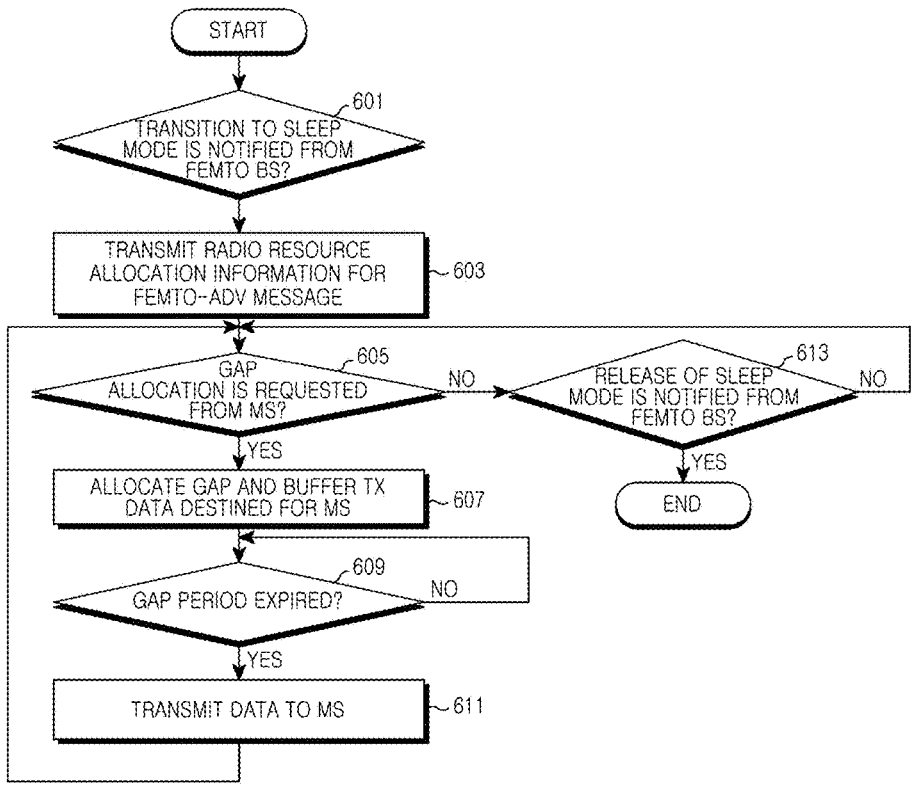
FIG. 6 illustrates an operation process of a macro BS in a broadband wireless communication system according to an exemplary embodiment of the present invention.

FIG. 6 is a flowchart illustrating an operation process of a macro BS in a broadband wireless communication system according to an exemplary embodiment of the present invention.

Referring to FIG. 6, in step 601, the macro BS determines whether it is notified of the transition to the sleep mode by the femto BS installed in the macro cell. To this end, the macro BS and the femto BS perform wireless communication or perform wired communication through a backhaul.

If notified of the transition to the sleep mode, the macro BS proceeds to step 603. In step 603, the macro BS transmits radio resource allocation information for transmission of the FEMTO-ADV message of the femto BS. More specifically, the macro BS allocates a portion of its radio resource as a radio resource for transmission of the FEMTO-ADV message of the femto BS, and broadcasts the radio resource allocation information to MSs. Herein, the radio resource is periodically allocated, and the macro BS does not use the allocated radio resource until the femto BS releases the sleep mode. That is, the macro BS is prohibited from using the allocated radio resource.

In step 605, the macro BS determines whether a gap allocation is requested from the MS. Herein, the gap denotes a period where the MS is to transmit the MOB-FEMTO-AWAKE-REQ message during the communication with the macro BS after reception of the FEMTO-ADV message.

If the gap allocation is requested, the macro BS proceeds to step 607. In step 607, the macro BS allocates the gap to the MS and buffers TX data destined for the MS. That is, because the MS cannot receive signals from the macro BS during the gap period, the macro BS buffers TX data destined for the MS.

In step 609, the macro BS determines whether the gap period has expired. If the gap period has not expired, the macro BS waits for the expiration of the gap period. On the other hand, if the gap period has expired, the macro BS proceeds to step 611 and transmits the buffered TX data to the MS.

If the gap allocation is not requested (in step 605), the macro BS proceeds to step 613. In step 613, the macro BS determines whether it is notified of the release of the sleep mode by the femto BS. If the release of the sleep mode is not notified, the macro BS returns to step 605. On the other hand, if the release of the sleep mode is notified, the macro BS ends the operation process. Accordingly, the macro BS can use the radio resource for the FEMTO-ADV message. That is, the macro BS releases the radio resource use prohibition.

Figure 7:
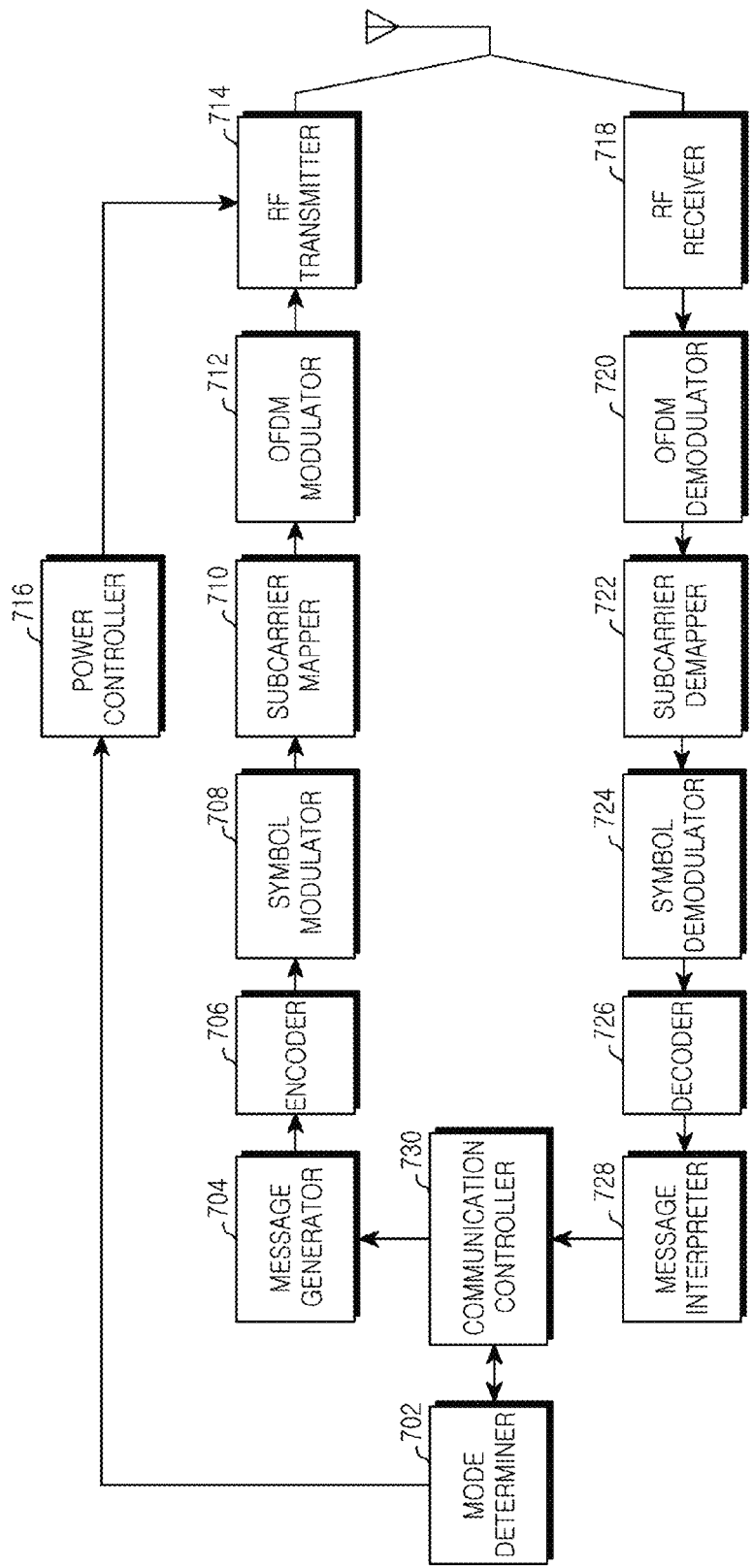
FIG. 7 illustrates a block diagram of a femto BS in a broadband wireless communication system according to an exemplary embodiment of the present invention.

FIG. 7 is a block diagram of a femto BS in a broadband wireless communication system according to an exemplary embodiment of the present invention.

Referring to FIG. 7, the femto BS includes a mode determiner 702, a message generator 704, an encoder 706, a symbol modulator 708, a subcarrier mapper 710, an OFDM modulator 712, a Radio Frequency (RF) transmitter 714, a power controller 716, an RF receiver 718, an OFDM demodulator 720, a subcarrier demapper 722, a symbol demodulator 724, a decoder 726, a message interpreter 728, and a communication controller 730.

The mode determiner 702 controls an operation mode of the femto BS. For example, the operation mode of the femto BS may be a sleep mode or an active mode. In the sleep mode, an operation for transmitting the FEMTO-ADV message transmission and an operation for waiting to receive the MOB-FEMTO-AWAKE-REQ message are performed but a communication with the MS is not performed. Thus, if there is no MS accessing the femto BS for a predefined time, the mode determiner 702 detects the need to transition to the sleep mode and controls other blocks to operate according to the sleep mode. Then, upon receiving the MOB-FEMTO-AWAKE-REQ message, the mode determiner 702 detects the need to release the sleep mode and transitions to the active mode, and controls other blocks to operate according to the active mode.

The message generator 704 generates a control message to be transmitted. In the sleep mode, the message generator 704 generates the FEMTO-ADV message to notify the presence of the femto BS to MSs located in the femto cell. Herein, the FEMTO-ADV message includes identification information of the femto BS and information necessary for transmission of the message to the femto BS. If the MOB-FEMTO-AWAKE-REQ message is received from the MS, the message generator 704 generates the MOB-FEMTO-AWAKE-RSP message to notify the reception of the MOB-FEMTO-AWAKE-REQ message and the release of the sleep mode.

The encoder 706 channel-codes an information bit string provided from the message generator 705. The symbol modulator 708 modulates the channel-coded bit string into complex symbols. The subcarrier mapper 710 maps the complex symbols to a frequency domain. In the sleep mode, the subcarrier mapper 710 maps a signal of the FEMTO-ADV message to radio resources allocated for transmission of the FEMTO-ADV message. At this point, the subcarrier mapper 710 also maps a signal for channel estimation and a signal for indicating information of the FEMTO-ADV message. For example, the subcarrier mapper 710 uses a preamble as illustrated in FIG. 3A, or uses pilot symbols as illustrated in FIG. 3B. Herein, the radio resource allocated for transmission of the FEMTO-ADV message is a portion of the radio resources of the macro BS. The OFDM modulator 712 converts the frequency-domain complex symbols into time-domain signals through an Inverse Fast Fourier Transform (IFFT) operation and inserts a Cyclic Prefix (CP) to generate an OFDM symbol. The RF transmitter 714 up-converts a baseband signal into an RF signal and transmits the same through an antenna.

The power controller 716 controls the power of a signal transmitted through the antenna. In the sleep mode, the power controller 716 limits the TX power of the FEMTO-ADV message so that the FEMTO-ADV message is not received by an MS located outside the femto cell. Specifically, the power controller 716 controls the TX power of the FEMTO-ADV message to be equal to the TX power of the common control channel or the broadcast channel. Herein, if the MS is to receive the FEMTO-ADV message after entry into the cell of the femto BS, the power controller 716 controls the TX power of the FEMTO-ADV message to be lower than the TX power of the common control channel or the broadcast channel in consideration of an additional gain value. On the other hand, if the femto BS is to release the sleep mode before the MS reaches a cell boundary point of the femto BS, the power controller 716 controls the TX power of the FEMTO-ADV message to be higher than the TX power of the common control channel or the broadcast channel.

The RF receiver 718 down-converts an RF signal received through the antenna into a baseband signal. The OFDM demodulator 720 divides a signal provided from the RF receiver 718 in units of OFDM symbols, removes a CP, and restores complex symbols mapped to the frequency domain through a Fast Fourier Transform (FFT) operation. The subcarrier demapper 722 extracts a signal mapped to the radio resource allocated to the MS from the complex symbols mapped to the frequency domain. The symbol demodulator 724 demodulates the complex symbols into a bit string. The decoder 726 channel-decodes the bit string to restore the information bit string.

The message interpreter 728 interprets the received control message. In the sleep mode, the message interpreter 728 determines whether the MOB-FEMTO-AWAKE-REQ message is received from the MS. Then, the message interpreter 728 notifies the mode determiner 702 of the reception of the MOB-FEMTO-AWAKE-REQ message.

The communication controller 730 performs control operations for communication with the MS. In particular, the communication controller 730 performs an operation for transmitting the FEMTO-ADV message and an access operation for the MS that has transmitted the MOB-FEMTO-AWAKE-REQ message. More specifically, in the sleep mode, the communication controller 730 determines whether the FEMTO-ADV message is transmitted in the current frame. Herein, in the case of an asynchronous system where the femto BS and the macro BS are not synchronous with each other, the communication controller 310 calculates the TX timing of the FEMTO-ADV message in consideration of the synchronization offset with the macro BS.

Figure 8:
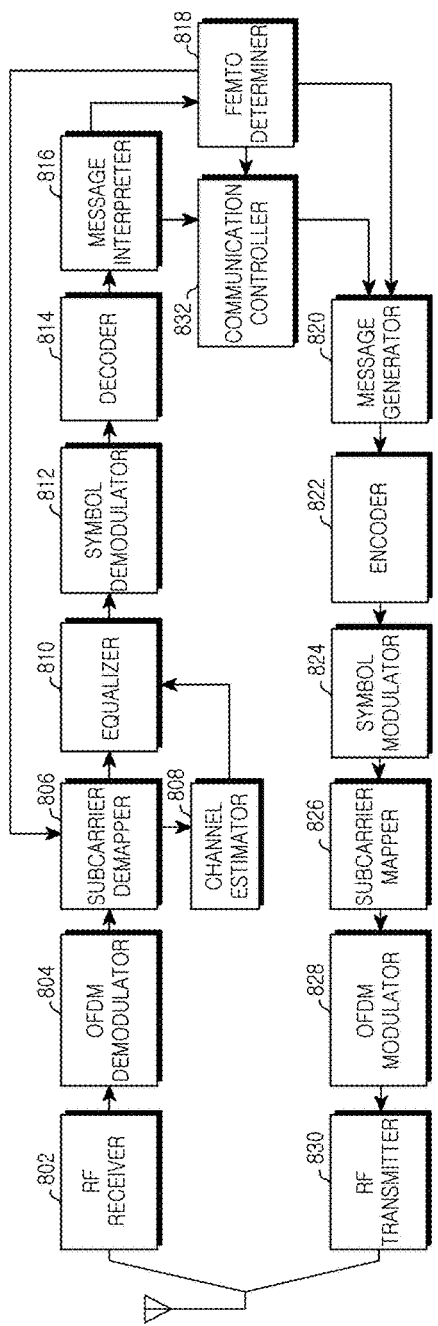
FIG. 8 illustrates a block diagram of an MS in a broadband wireless communication system according to an exemplary embodiment of the present invention.

FIG. 8 is a block diagram of an MS in a broadband wireless communication system according to an exemplary embodiment of the present invention.

Referring to FIG. 8, the MS includes an RF receiver 802, an OFDM demodulator 804, a subcarrier demapper 806, a channel estimator 808, an equalizer 810, a symbol demodulator 812, a decoder 814, a message interpreter 816, a femto determiner 818, a message generator 820, an encoder 822, a symbol modulator 824, a subcarrier mapper 826, an OFDM modulator 828, an RF transmitter 830, and a communication controller 832.

The RF receiver 802 down-converts an RF signal received through an antenna into a baseband signal. The OFDM demodulator 804 divides a signal provided from the RF receiver 802 in units of OFDM symbols, removes a CP, and restores complex symbols mapped to the frequency domain through an FFT operation. The subcarrier demapper 806 extracts a signal mapped to a radio resource of the MS from the complex symbols mapped to the frequency domain. In particular, according to an exemplary embodiment of the present invention, the subcarrier demapper 806 extracts a signal mapped to a radio resource allocated for transmission of the FEMTO-ADV message in a frame receiving the FEMTO-ADV message.

The channel estimator 808 estimates a channel between the MS and the BS by using a preamble signal or a pilot symbol, and provides the channel estimation value to the equalizer 810. In particular, according to an exemplary embodiment of the present invention, when attempting to receive the FEMTO-ADV message, the channel estimator 808 estimates the channel by using the pilot symbol preamble signal included in a signal of the FEMTO-ADV message. By using the channel estimation value, the equalizer 810 compensates the channel distortion of the RX signal provided from the subcarrier demapper 806. The symbol demodulator 812 demodulates complex symbols into a bit string. The decoder 814 channel-decodes the bit string to restore an information bit string.

The message interpreter 816 interprets the received control message. In particular, the message interpreter 816 determines whether the FEMTO-ADV message is received. That is, the message interpreter 816 performs an error check on the bit string converted from a signal received through the radio resource allocated for transmission of the FEMTO-ADV message, and determines whether the bit string includes values corresponding to the FEMTO-ADV message, thereby determining whether the FEMTO-ADV message is received. Herein, the FEMTO-ADV message may include information about a TX timing and an uplink ranging code resource used for transmission of the MOB-FEMTO-AWAKE-REQ message.

The femto determiner 818 determines whether the MS has entered the cell of the sleep-mode femto BS. That is, when the reception of the FEMTO-ADV message is detected by the message interpreter 816, the femto determiner 818 detects that the MS has entered the cell of the femto BS, and performs an operation for releasing the sleep mode of the femto BS. That is, the femto determiner 818 controls the message generator 820 to generate the MOB-FEMTO-AWAKE-REQ message. Then, upon receiving the MOB-FEMTO-AWAKE-REQ message from the femto BS, the femto determiner 818 triggers the communication controller 832 to perform an access operation with respect to the femto BS. Herein, if information indicating the CSG access-mode operation of the femto BS is included in the FEMTO-ADV message, the femto determiner 818 determines whether the MS is accessible to the femto BS transmitting the FEMTO-ADV message, and then controls the message generator 820 to generate the MOB-FEMTO-AWAKE-REQ message when there is an accessible femto BS. For example, the femto determiner 818 determines the accessibility by comparing a prestored accessible CSG identifier list and a CSG identifier included in the FEMTO-ADV message.

The message generator 820 generates a control message to be transmitted. In particular, the message generator 820 generates the MOB-FEMTO-AWAKE-REQ message under the control of the femto determiner 818. In addition, the message generator 820 generates messages for the access operation under the control of the communication controller 832.

The encoder 822 channel-codes the information bit string provided from the message generator 820. The symbol modulator 824 modulates the channel-coded bit string into complex symbols. The subcarrier mapper 826 maps the complex symbols to the frequency domain. The OFDM modulator 828 converts the frequency-domain complex symbols through an IFFT operation and inserts a CP to generate an OFDM symbol. The RF transmitter 830 up-converts a baseband signal into an RF signal and transmits the same through the antenna.

The communication controller 832 performs all the control operations for communication. In particular, the communication controller 832 performs an access operation with respect to the femto BS. More specifically, the communication controller 832 controls the MOB-FEMTO-AWAKE-REQ message to be transmitted according to the random access scheme or the dedicated access scheme. According to the dedicated access scheme, the communication controller 832 uses information about the TX timing and the uplink ranging code resource included in the FEMTO-ADV message. In addition, if the MS is to transmit the MOB-FEMTO-AWAKE-REQ message during the communication with the macro BS, the communication controller 832 requests the macro BS to allocate a gap period, and controls the MOB-FEMTO-AWAKE-REQ message to be transmitted during the gap period. In addition, the communication controller 832 detects the reception of the MOB-FEMTO-AWAKE-RSP message according to the transmission of the MOB-FEMTO-AWAKE-REQ message. At this point, if the MOB-FEMTO-AWAKE-RSP message is not received within a predefined time after transmission of the MOB-FEMTO-AWAKE-REQ message, the communication controller 832 controls the MOB-FEMTO-AWAKE-REQ message to be retransmitted. Herein, the number of times of the MOB-FEMTO-AWAKE-REQ message is retransmitted is limited to (M−1).

Figure 9:
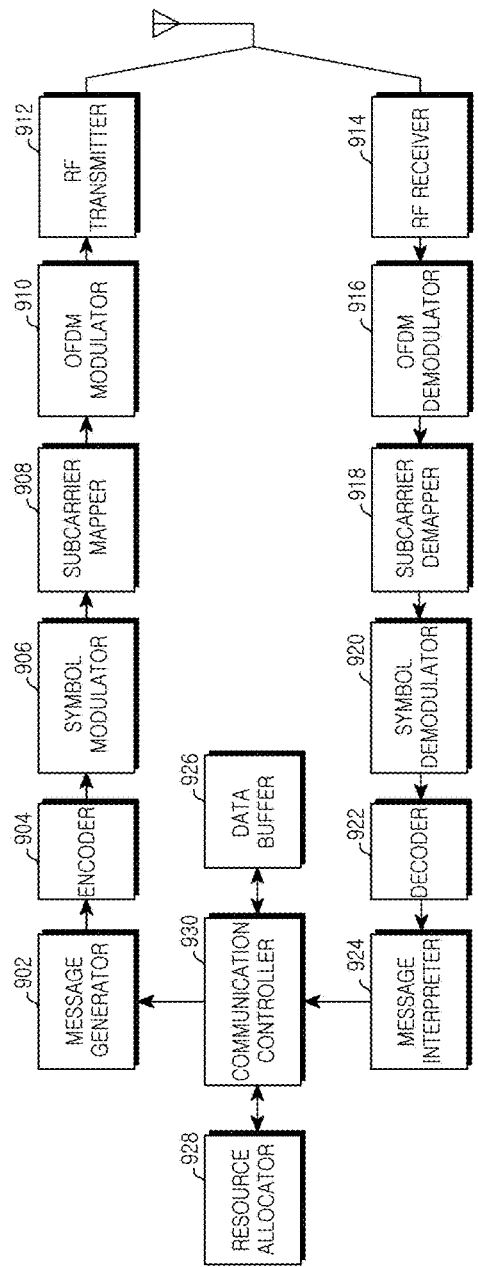
FIG. 9 is a block diagram of a macro BS in a broadband wireless communication system according to an exemplary embodiment of the present invention.

FIG. 9 is a block diagram of a macro BS in a broadband wireless communication system according to an exemplary embodiment of the present invention.

Referring to FIG. 9, the macro BS includes a message generator 902, an encoder 904, a symbol modulator 906, a subcarrier mapper 908, an OFDM modulator 910, an RF transmitter 912, an RF receiver 914, an OFDM demodulator 916, a subcarrier demapper 918, a symbol demodulator 920, a decoder 922, a message interpreter 924, a data buffer 926, a resource allocator 928, and a communication controller 930.

The message generator 902 generates a control message to be transmitted. In particular, when the femto BS located in the macro cell transitions to the sleep mode, the message generator 902 generates a broadcast message including the allocation information of the radio resource for transmission of the FEMTO-ADV message of the femto BS. The encoder 904 channel-codes an information bit string provided from the message generator 902. The symbol modulator 906 modulates the channel-coded bit string into complex symbols. The subcarrier mapper 908 maps the complex symbols to the frequency domain. The OFDM modulator 910 converts the frequency-domain complex symbols into time-domain signals through an IFFT operation and inserts a CP to generate an OFDM symbol. The RF transmitter 912 up-converts a baseband signal into an RF signal and transmits the same through an antenna.

The RF receiver 914 down-converts an RF signal received through the antenna into a baseband signal. The OFDM demodulator 916 divides a signal provided from the RF receiver 714 in units of OFDM symbols, removes a CP, and restores complex symbols mapped to the frequency domain through an FFT operation. The subcarrier demapper 918 extracts a signal mapped to the radio resource allocated to the MS from the complex symbols mapped to the frequency domain. The symbol demodulator 920 demodulates the complex symbols into a bit string. The decoder 922 channel-decodes the bit string to restore the information bit string. The message interpreter 924 interprets the received control message. In particular, the message interpreter 924 interpreters a gap allocation request message received from the MS. Then, the message interpreter 924 notifies the communication controller 930 of the generation of the gap allocation request.

The data buffer 926 temporarily stores data communicated with the MS, and outputs the stored data under the control of the communication controller 930. In particular, the data buffer 926 stores TX data destined for the MS requesting the gap allocation. The resource allocator 928 allocates radio resources for communication to accessed MSs. In particular, when the femto BS located in the macro cell transitions to the sleep mode, the resource allocator 928 allocates a radio resource for transmission of the FEMTO-ADV message of the femto BS. Herein, the location of the radio resource is predefined or determined according to resource conditions.

The communication controller 930 performs control operations for communication with the MS. In particular, the communication controller 930 detects the sleep mode transition and the sleep mode release reported from the femto BS, and controls corresponding operations. When the macro BS is notified of the transition to the sleep mode, the communication controller 930 controls the resource allocator 928 to allocate a radio resource for transmission of the FEMTO-ADV message, and controls the allocation information of the radio resource for transmission of the FEMTO-ADV message to be broadcasted. In addition, the communication controller 930 prohibits the use of the radio resource for transmission of the FEMTO-ADV message, and releases the prohibition of the use of the radio resource when the macro BS is notified of the release of the sleep mode. Then, when the gap allocation is requested from the MS, the communication controller 930 controls TX data destined for the MS to be buffered for the gap period, and controls the TX data to be transmitted to the MS upon expiration of the gap period.

As described above, exemplary embodiments of the present invention use a hierarchical cell structure to operate the sleep mode of the indoor femto BS in a broadband wireless communication system, thereby making it possible to reduce interference caused by the femto BS and power consumption of the femto BS. In addition, instead of transmitting the signals for the normal BS operation in all frames, the femto BS periodically transmits a limited signal in each specific frame in the sleep mode period, thereby making it possible to reduce interference on the adjacent macro BS access user and the adjacent femto BS access user.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an operation of a femto Base Station (BS) in a wireless communication system, the method comprising:
   transitioning into a sleep mode if there is no accessed Mobile Station (MS) for a predefined time;
   transmitting a first message in the sleep mode to notify of the presence of the femto BS; and
   releasing the sleep mode upon receiving a second message from an MS that has received the first message,
   wherein the transmitting of the first message comprises transmitting the first message periodically through a portion of radio resources of a macro BS that are allocated to the femto BS by the macro BS,
   wherein the second message is received during a gap period allocated to the MS by the macro BS for transmission of the second message, and
   wherein the second message corresponds to a message informing the femto BS to release the sleep mode.

2. The method of claim 1, wherein the transmitting of the first message comprises controlling the transmit (TX) power of the first message to be substantially equal to at least one of the TX power of a common control channel and a broadcast channel of the femto BS.

3. The method of claim 1, wherein the transmitting of the first message comprises generating a signal including the first message in a substantially same way as generating a signal by the macro BS.

4. The method of claim 3, wherein the first message signal comprises at least one of a pilot symbol and a preamble.

5. The method of claim 1, further comprising:
   notifying a macro BS of the transition to the sleep mode; and
   notifying the macro BS of the release of the sleep mode.

6. A method for an operation of a Mobile Station (MS) in a wireless communication system, the method comprising:
   receiving a first message from a femto Base Station (BS) in a sleep mode in a macro cell;
   transmitting, to the macro BS, a request for the macro BS to allocate a gap period during which the MS will transmit the second message;
   transmitting a second message to the femto BS upon receiving the first message; and
   accessing the femto BS,
   wherein the receiving of the first message comprises determining whether the first message is periodically received through a portion of radio resources of a macro BS that are allocated to the femto BS from the macro BS, and
   wherein the second message corresponds to a message informing the femto BS to release the sleep mode.

7. The method of claim 6, wherein the transmitting of the second message comprises:
   comparing an accessible Closed Subscriber Group (CSG) identifier list and a CSG identifier included in the first message; and
   transmitting the second message if the CSG identifier is included in the CSG identifier list.

8. The method of claim 6, further comprising:
   estimating a channel between the MS and the femto BS by using at least one of a preamble and a pilot symbol included in a signal comprising the first message; and
   compensating a channel distortion by using a result of the channel estimation.

9. An apparatus for a femto Base Station (BS) in a wireless communication system, the apparatus comprising:
   a transmitter for transmitting a first message in a sleep mode to notify of the presence of the femto BS;
   a mode determiner control unit for controlling transitioning into the sleep mode if there is no accessed Mobile Station (MS) for a predefined time, and for controlling releasing the sleep mode upon receiving a second message from an MS which has received the first message; and
   a communication controller for communicating with the MS,
   wherein the transmitter transmits the first message periodically through a portion of radio resources of a macro BS that are allocated to the femto BS by the macro BS,
   wherein the second message is received during a gap period allocated to the MS by the BS for transmission of the second message, and
   wherein the second message corresponds to a message informing the femto BS to release the sleep mode.

10. The apparatus of claim 9, further comprising a power controller for controlling the transmit (TX) power of the first message to be substantially equal to at least one of the TX power of a common control channel and a broadcast channel of the femto BS.

11. The apparatus of claim 10, wherein the transmitter generates a signal including the first message in a substantially same way as a signal is generated by the macro BS.

12. The apparatus of claim 11, wherein the first message signal comprises at least one of a pilot symbol and a preamble.

13. The apparatus of claim 9, wherein the mode determiner control unit notifies a macro BS of the transition to the sleep mode, and notifies the macro BS of the release of the sleep mode.

14. An apparatus for a Mobile Station (MS) in a wireless communication system, the apparatus comprising:
   a receiver for receiving a first message from a femto Base Station (BS) in a sleep mode servicing a shadow area in a macro cell;

a transmitter for transmitting a second message to the femto BS upon receiving the first message, and for transmitting to the macro BS, a request for the macro BS to allocate a gap period during which the MS will transmit the second message; and a communication controller for accessing the femto BS, wherein the receiver receives the first message periodically through a portion of radio resources of a macro BS that are allocated to the femto BS by the macro BS, and wherein the second message corresponds to a message informing the femto BS to release the sleep mode.

15. The apparatus of claim 14, wherein the communication controller compares a stored accessible Closed Subscriber Group (CSG) identifier list and a CSG identifier included in the first message, and the transmitter transmits the second message if the CSG identifier is included in the CSG identifier list.

16. The apparatus of claim 14, further comprising:

a channel estimator for estimating a channel between the MS and the femto BS by using at least one of a preamble and a pilot symbol included in a signal comprising the first message; and an equalizer for compensating a channel distortion by using a result of the channel estimation.

17. The method of claim 1, wherein the transmitting of the first message comprises controlling the transmit (TX) power of the first message to be sufficiently higher than the TX power at which the femto BS transmits, when the femto BS is not in the sleep mode, a common control channel and a broadcast channel so as to enable the femto BS to release the sleep mode before the MS reaches a cell boundary point of the femto BS.

18. The apparatus of claim 9, further comprising:

a power controller that is configured to control the transmit (TX) power of the first message to be sufficiently higher than the TX power at which the femto BS transmits, when the femto BS is not in the sleep mode, a common control channel and a broadcast channel, so as to enable the femto BS to release the sleep mode before the MS reaches a cell boundary point of the femto BS.

19. The method of claim 1, wherein while in the sleep mode, the femto BS refrains from system information transmission, frame synchronization information transmission, preamble transmission, resource allocation information transmission, and data transmission/reception.

20. The method of claim 1, wherein the first message is converted into a format identical to a format used for signals transmitted by the macro BS.

21. The method of claim 1, wherein the first message includes at least one of information about a frequency band of the femto BS, information about an access mode of the femto BS, information about a Closed Subscriber Group (CSG) BS operation state indication bit of the femto BS, information about a CSG identifier accessible to the femto BS, and information about a BS identifier allocated to the femto BS uniquely in the network.

22. The method of claim 1, wherein the first message includes information about transmission timing and uplink ranging code resource used as the response message.

* * * * *